United States Patent [19]
Rupp

[11] Patent Number: 4,847,161
[45] Date of Patent: Jul. 11, 1989

[54] MAGNETICALLY ANISOTROPIC RECORDING MEDIUM

[75] Inventor: Günter Rupp, Rathsberg, Fed. Rep. of Germany

[73] Assignee: Siemens Aktiengesellschaft, Berlin & Munich, Fed. Rep. of Germany

[21] Appl. No.: 121,222

[22] Filed: Nov. 16, 1987

[30] Foreign Application Priority Data

Dec. 19, 1986 [DE] Fed. Rep. of Germany ....... 3643609

[51] Int. Cl.$^4$ .................................................. G11B 5/64
[52] U.S. Cl. ..................................... 428/450; 428/611; 428/615; 428/641; 428/668; 428/694; 428/900
[58] Field of Search ............... 428/611, 450, 615, 641, 428/668, 694, 900, 928

[56] References Cited

U.S. PATENT DOCUMENTS

| | | | |
|---|---|---|---|
| 3,479,156 | 11/1969 | Ginder | 428/635 |
| 3,516,076 | 6/1970 | Stein | 428/656 |
| 3,787,237 | 1/1974 | Grunberg et al. | 428/928 |
| 4,610,935 | 9/1986 | Kumasaka et al. | 428/632 |
| 4,677,032 | 6/1987 | Robinson | 428/611 |

FOREIGN PATENT DOCUMENTS

| | | |
|---|---|---|
| 0071489 | 2/1983 | European Pat. Off. |
| 0089609 | 9/1983 | European Pat. Off. |
| 0158338 | 10/1985 | European Pat. Off. |
| 0216610 | 4/1987 | European Pat. Off. |
| 83218 | 11/1985 | Japan |

OTHER PUBLICATIONS

Japanese Patent Abstracts, vol. 8, No. 13, May 26, 1984.
IEEE Transactions on Magnetics: vol. 14, No. 5, Sep. 1978, pp. 849-851.
vol. 16, No. 1, Jan. 1980, pp. 71-76.
vol. 18, No. 2, Mar. 1982, pp. 769-771.
IEEE Transactions on Magnetics: vol. 18, No. 6, Nov. 1982, pp. 1170-1172.
vol. 19, No. 5, Sep. 1983, pp. 1617-1619.
vol. 20, No. 5, Sep. 1984, pp. 657-662.
vol. 21, No. 5, Sep. 1985, pp. 1426-1428.
vol. 22, No. 5, Sep. 1986, pp. 328-330.

*Primary Examiner*—Paul J. Thibodeau
*Attorney, Agent, or Firm*—Kenyon & Kenyon

[57] ABSTRACT

The disclosure is directed to a magnetically anisotropic recording medium (2) containing a disc-shaped substrate (3) of nonmagnetic material, on the flat side (4) of which is applied a thin lower layer (8) of Si, Ge or Ti, and thereon a Co-containing alloy with vertical magnetic anisotropy. This recording medium is to assure a large signal level without the need for a special magnetically soft substrate. For this purpose, a sandwich-like multilayer structure (7) is provided according to the invention, in which at least three storage layers (10 to 13) of the Co-containing alloy with a respective thickness ($d_s$) of at most 100 nm are separated by comparatively thinner intermediate layers (15 to 17) of the Si, Ge and/or Ti. The recording medium is advantageously provided for discs of data memories with perpendicular (vertical) magnetization.

3 Claims, 1 Drawing Sheet

MAGNETICALLY ANISOTROPIC RECORDING MEDIUM

BACKGROUND OF THE INVENTION

The invention relates to a magnetically anisotropic recording medium for perpendicular (vertical) magnetization including a disc-shaped substrate of nonmagnetic material which is provided on at least one flat side with a lower layer, the material of which contains, at least as the main component, silicon, germaniun and/or titanium and to which a colbalt (Co)-containing alloy is applied in layers having an axis of easy magnetization which lies at least largely in the direction of the normal relative to the flat side of the substrate. Such a recording medium is illustrated in the publication "IEEE Trans. Magn.", Vol. MAG-21, No. 5, September '85, pages 1426 to 1428.

The principle of vertical magnetization for storing information in suitable recording media is generally known (see, for example, "IEEE Trans. Magn.", Vol. MAG-16, No. 1, Jan. '80, pages 71 to 76, and Vol. MAG-20, No. 5, September '84, pages 657 to 662 and 675 and 680). The recording media provided for this principle, which is often also called vertical magnetization, can be present, for instance, in the form of rigid magnetic storage discs. Such a recording medium has a recording layer which can be magnetized and comprises a material with vertical magneto-crystalline anisotropy, where the axis of the so-called easy magnetization of this layer is oriented perpendicularly to the surface of the recording medium. A preferred corresponding storage material is CoCr (see, for example, "IEEE Trans. Magn.", Vol, MAG-14, No. 5, September '78, pages 849 to 851). By means of special magnetic heads, the individual pieces of information can then be written as bits along a track in subsequent sections by suitable mangetization of the recording layer. The bits have here a predetermined dimension in the lengthwise direction of the track, also called wavelength. This dimension can be substantially smaller as compared to the limit which is given for storage according to the known principle of longitudinal (horizontal) magnetization. Thus, the information which can be stored in the special recording media can be increased by use of the principle of vertical magnetization.

For recording by vertical magnetization of such a medium, special magnetic heads have been developed of which the magnetic conductors formed by magnet legs have, in particular, a shape similar to a ring head (see, for example, European Pat. No. A-0 012 910). With this type of head, the problem arises however, to generate a sufficiently strong signal in the recording medium. This is due, among other things to the chosen material, CoCr, itself. As is well known, the signal level is determined by the magnitude of the coercivity of the material coupled to the magnetic remance via the demagnetization factor (see, for example, "IEEE Trans. Magn." Vol MAG-18, No. 2, March '82, pages 769 to 771). Now, the remance of CoCr is approximately equal to the coercivity since for this material, the demagnetization factor is nearly 1. While the coercivity can be increased within certain limits this must always be smaller than the magnetic writing field to be generated by the magnetic head for unequivocal magnetization conditions. However, because the desired miniaturization of the head design, correspondingly narrow limits are set to the magnitude of this head field. Thus, the maximum vertical head field intensities are generally below 100 kA/m.

One now attempts to solve the problem of insufficient head field strengths, for instance, by going to a type of head which has only a single magnet pole for writing (see, for example, "IEEE Trans. Magn." Vol. MAG-18, No. 6, November '82, pages 1170 to 1172 and European Patent No. A-0 071 489). The writing field of such a magnetic head, also called a single-pole head, can be obtained approximately also by special measures regarding the preference of one of the two magnet legs of a magnetic head with a shape similar to a ring head (see, for example, European Pat. No. A-0 166 818). In the mentioned head types, there is, however, the difficulty of returning the magnetic flux. One is therefore generally compelled to arrange under the recording layer of the CoCr alloy a further magnetically soft layer such as, for instance, a layer of "Permalloy" (Trade Mark of "Bell Telephone Manufacturing Co."). While such a lower layer leads advantageously, in the writing process, to an increase of the magnetic field strength at the point of the recording medium and thus, to the signal level, additional problems are connected with this measure such as a so-called "peak" or "bit shift" (see, for example, "IEEE Trans. Magn." Vol. MAG-19, No. 5, September '83, pages 1617 to 1619). These problems, however, have not been solved satisfactorily to date.

Such a magnetically soft lower layer is not provided in the recording medium which is known from the publication mentioned at the outset or European Pat. No. A-0 158 338. This medium contains a disc-shaped substrate of a nonmagnetic material such as aluminum. To this substrate is applied a lower layer of silicon or germanium with a thickness between 1 nm and 1 μm. This layer serves as an underlayer for a CoCr layer to be applied thereon which should have a thickness in the order of 500 nm or more. The lower layer has, in particular, the purpose of promoting the incorporation of a vertical magnetic anisotropy in the CoCr layer to be deposited thereon. It has been observed that on such a lower layer, a CoCr material is formed, the hexagonal axis of which is perpendicular to the layer plane, where the hexagonal axis determines the easy direction of magnetization. It has been found however, that the magnetic remanence of such a recording layer and thereby, the signal level that can be obtained are distinctly smaller than in a CoCr layer with a magnetically soft lower layer.

SUMMARY OF THE INVENTION

It is, therefore, the object of the present invention to further develop the recording medium of the type mentioned at the outset in such a way that a higher signal level is made possible thereby without the need of a separate magnetically soft underlayer.

According to the invention, this problem is solved by the provision that the recording layer has a sandwich-like multilayer structure, in which at least three storage layers of Co-containing alloy, each with a respective thickness of at most 100 nm, are separated by comparatively thinner intermediate layers of the Si, the Ge and-/or the Ti material.

The invention is based on the insight that with the maximum magnetic fields of known magnetic heads for vertical magnetization, the remanence increases if one goes to thinner CoCr layers of less than about 100 nm. This effect is explained by a development of smaller and smaller domains with decreasing layer thickness. So that now the advantage of increasing the remanence for decreasing layer thickness can be exploited, a multilayer structure with at least three thin CoCr storage layers is provided for the recording layer. The intermediate layers in this multilayered structure comprise comparatively still thinner Si, Ge or Ti layers, the purpose of which is to decouple the Co-containing storage layer magnetically from each other and, in addition, to provide in the preparation of the layers, a good seed layer for developing the desired magnetic anisotropy. The advantages that can be achieved with the multilayered structure according to the invention are, in particular, the following:

1. The increase of the magnetic remanence in the individual storage layers leads to a correspondingly larger read signal.
2. Smaller domains improve the signal-to-noise ratio of the recording layer and are advantageous for higher storage densities.
3. On the magnetic write field of the magnetic head used, the coercivity of the recording layer can be adjusted since, as is well known, this coercivity increased with the layer thickness in the region of thin layers.
4. In addition, a graduation of the coercivity is possible so that, with increasing distance of the magnetic head, corresponding to the decreasing write field, also the coercivity of the layers decreases.

While multilayer structures of magnetic recording mediums for the vertical magnetization are known from "IEEE Trans. Magn." Vol. MAG-22, No. 5, September '86, pages 328 to 330 and "Journ. Magn. and Magn. Mat.", Vol. 54–57, 1986, pages 1683 and 1684, these publications do not concern themselves with the problems of signal level improvement by increasing the remanence.

For a detailed description of the invention, reference is made to the accompanying drawings.

DETAILED DESCRIPTION

Figure 1:
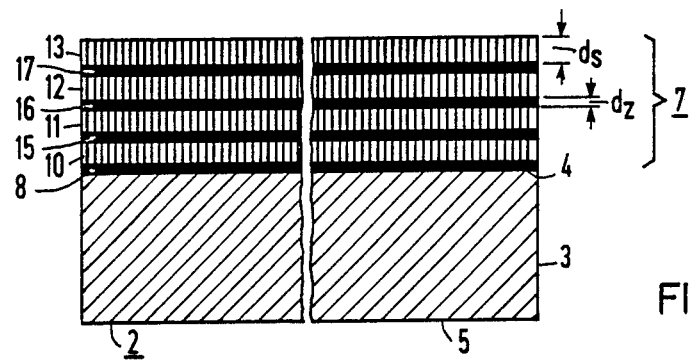
FIG. 1 illustrates a side cross sectional view of a portion of a recording medium according to the invention.

In the portion of a recording medium according to the invention shown in FIG. 1, known disc-shaped media are taken as the starting point such as must be provided for storage systems operating according to the principle of vertical magnetization. The recording medium, generally designated by the reference numeral 2, contains a disc-like substrate which may have, for instance, a generally customary diameter of 5.25 inches. The substrate 3 consists of a nonmagnetic material such as lime-sodium silicate glass or of aluminum or an aluminum alloy. On at least one of the two flat sides 4 or 5 of the substrate 3, with extreme surface evenness and smoothness, there is provided, according to the invention, a multilayer structure 7. In addition, between this structure 7 and the flat side 4, a thin underlayer 8 of silicon (Si) or germanium (Ge) or titanium (Ti) is provided in the manner known per se. The multilayer structure 7 which forms the recording layer proper of the recording medium 2 should comprise, according to the invention, at least three storage layers of a Co-containing alloy such as, in particular, CoCr, where adjacent storage layers are always spaced by a thinner intermediate layer. The storage layers should have, in the manner known per se, an axis of easy magnetization which is at least largely perpendicular to the flat side 4 or 5 of the substrate 3. As the material for the intermediate layers, Si, Ge or Ti or an alloy with these elements is provided. Possibly further required layers, such as for flattening and for surface protection, are not detailed in the figure. According to the exemplary embodiment shown, the multilayer structure 7 contains four storage layers 10 to 13 which are seated by intermediate layers 15 to 17. The storage layers 10 to 13 each should have a thickness, $d_s$, of at most 100 nm, while the respective thickness, $d_z$, of the intermediate layers 15 to 17 is chosen as less than 50 nm. Accordingly, the multilayer structure 7 shown can be built up in sandwich-fashion from CoCr storage layers 10 to 13, 50 nm thick and of Si intermediate layers 15 to 17, 20 nm thick. For the storage layers and/or the intermediate layers, different materials can also be chosen.

Figure 2:
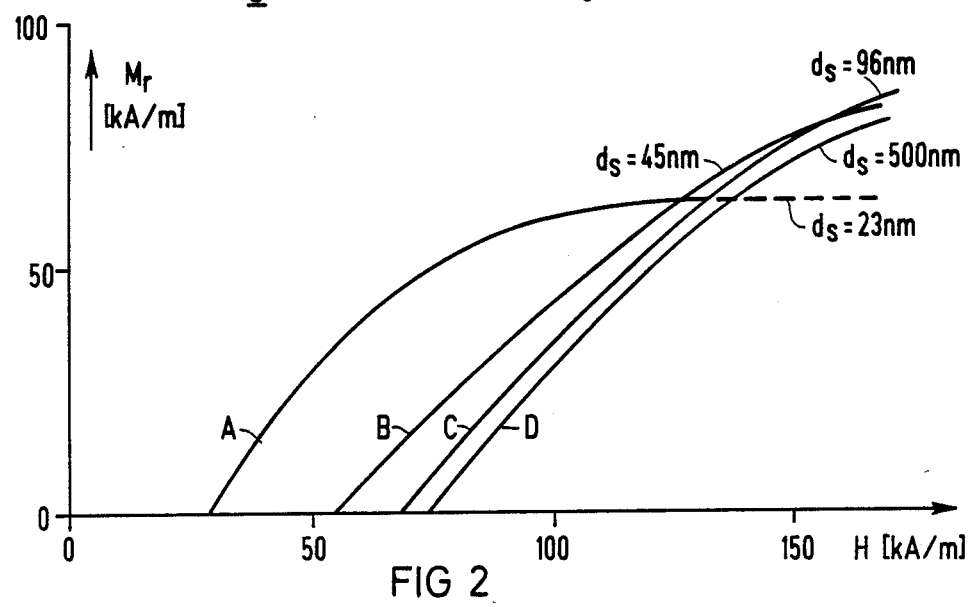
FIG. 2 illustrates, in diagram form, the remanence of the multiple layers of such a recording medium measured on layers of different thickness, as a function of the maximum magnetic field applied.

In the diagram of FIG. 2, the effective magnetic remanence $M_r$ of four individual CoCr storage layers of different thickness $d_s$ is shown as a function of the maximum vertical field strength of an external magnetic field H. Here, layer thicknesses $d_s$ of 23 nm, 45 nm, 96 nm and 500 nm, respectively, are assumed for the measurement curves designated by the letters A to D. As can clearly be seen from the diagram of the figure only with a storage layer 23 nm thick (curve A) a sufficiently large value of the remanence $M_r$ can, for instance, be achieved with a field strength of 50 kA/m such as can be generated without problem by a magnetic head, and thereby the condition for a sufficient signal level, i.e, the remanence of an individual thin layer is larger than that of an individual comparatively thicker layer, assuming that the maximum available magnetic field is limited.

Figure 3:
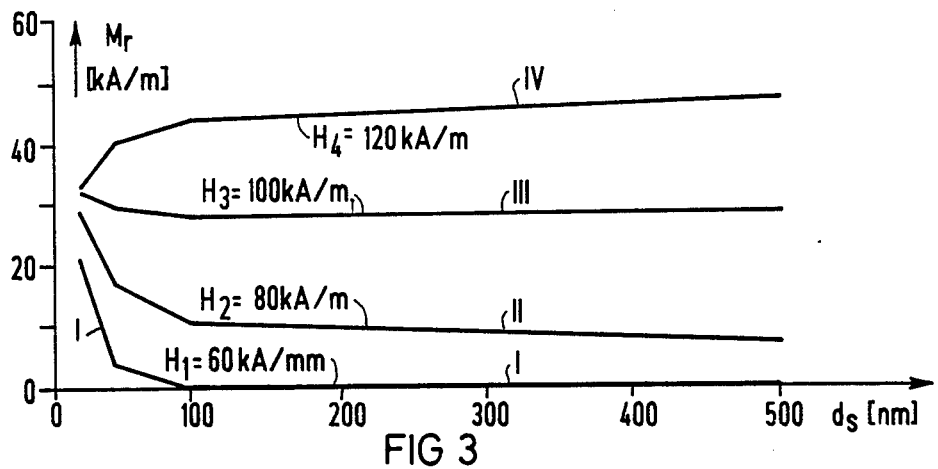
FIG. 3 illustrates, in diagram form, the remanence of a multilayer structure as a function of the layer thickness of the individual layers for different maximum magnetic head field strengths.

Since on the other hand, the signal level is proportional to the magnetized volume, signal level would be lost if only a single comparatively thin storage layer would be used due to this volume effect. For this reason, a multilayer structure of several magnetically decoupled layers is provided according to the invention. Such a multilayer structure with intermediate layers of Si 20 nm thick is made the basis of the diagram shown in FIG. 3. Through these magnetically "dead" Si layers, a fraction of the magnetization is lost. Taking this volume effect into consideration, the effective magnetic resonance for given head fields can be determined from the diagram. In the diagram are plotted on the abscissa the thickness $d_s$ of the individual storage layers of CoCr of the multilayer structure and on the ordinate, the effective remanence $M_r$. For four different maximum vertical field strengths H of a writing magnetic head, a specific curve-shape of the remanence is then obtained in the multilayer structure. With the individual curves are then associated magnetic-field strengths $H_1$ to $H_4$ of 60 kA/m (curve I), 80 kA/m (curve II), 100 kA/m (curve III) or 120 kA/m (curve IV), respectively. If one assumes as a fact that with known magnetic heads, only field strengths below 100 kA/m can be achieved in the multilayer structure, it can be seen clearly from the shape of the curves I to III of the diagram that especially with thicknesses $d_s$ of the individual storage layers below 100 nm, a distinct increase of the effective remanence $M_r$ is connected with decreasing layer thickness. This effect is utilized in the multilayer structure according to the invention, i.e., the multilayer structure according to the invention is suitable especially for magnetic heads, with which only a relatively weak writing field, especially below 100 kA/m is to be generated.

What is claimed is:

1. In a data storing device including a magnetic anisotropic recording medium having a plate-like substrate of non-magnetic material, which is provided on at least one flat side with a thin underlayer, the material of which contains, at least as the main component, an element selected from the group consisting of silicon (Si), germanium (Ge) and titanium (Ti) and to which a recording layer comprising multilayers of a cobalt (Co) containing alloy is applied, said recording layer having an easy axis of magnetization which lies at least largely in the direction of the normal with respect to the flat side of the substrate, and a magnetic head which is guided over the recording medium and with which a vertical writing field for the magnetization of the recording medium is to be generated, the improvement wherein the underlayer is applied directly to the substrate and a recording medium which comprises a multilayer structure including at least three storage layers of the Co-containing alloy, each having a thickness of at most 100 nm and being separated from one another by an intermediate layer of a material which contains as least as the main component an element selected from the group consisting of silicon (Si) and germanium (Ge), each of said intermediate layers having a thickness which is comparatively thinner relative to the thickness of each adjacent storage layer and which thickness of each one of the intermediate layers is of at most 50 nm, whereby the recording layer and underlayer are applied to the substrate in the absence of a layer of soft-magnetic material between the substate and the underlayer and the recording layer and that, for the magnetization of the recording medium, the multilayer structure is subjected to the vertical writing field of the magnetic head, whose maximal writing field strength at the surface of the multilayer is below 100 kA/m.

2. The recording medium of claim 1, wherein the thickness ($d_z$) of the intermediate layers is less than 50 nm.

3. The recording medium of either of claims 2 or 1, wherein the storage layers comprise a CoCr alloy.

* * * * *